United States Patent [19]
Nash et al.

[11] Patent Number: 4,747,121
[45] Date of Patent: May 24, 1988

[54] REMOTE CONTROL SLIDE PROJECTOR MODULE

[75] Inventors: Albert J. Nash, Merrick; Richard Chan, Brooklyn; Joseph Vitale, West Babylon, all of N.Y.

[73] Assignee: Educational Technology, Inc., Merrick, N.Y.

[21] Appl. No.: 858,028

[22] Filed: May 1, 1986

[51] Int. Cl.[4] .............................................. H01N 7/14
[52] U.S. Cl. ...................................... 379/53; 379/202
[58] Field of Search ...................... 353/25, 94; 358/85; 379/53, 54, 202; 368/296; 379/205, 207

[56] References Cited

U.S. PATENT DOCUMENTS

| | | | |
|---|---|---|---|
| 3,566,370 | 2/1971 | Worthington, Jr. et al. | 353/25 |
| 4,025,757 | 5/1977 | McKay et al. | 235/54 F |
| 4,041,457 | 8/1977 | Koch | 340/825.56 |
| 4,516,156 | 5/1985 | Fabras et al. | 379/53 |
| 4,568,161 | 2/1986 | DiGianfilippo et al. | 353/25 |
| 4,609,779 | 9/1986 | Rogers | 358/296 |

FOREIGN PATENT DOCUMENTS 0041902 12/1981 European Pat. Off. .

OTHER PUBLICATIONS

Stockbridge, Christopher, "The Evolution of a Multimode Multilocation Audioconferencing System", 8079 *Electro. Conf. Record*, vol. 4, (Apr. 1979).

Trueman, R. "A Communication System for Remote Conference", *Systems Technology*, 6/76, No. 24, pp. 17-21.

Primary Examiner—Robert Lev
Attorney, Agent, or Firm—McAulay, Fields, Fisher, Goldstein & Nissen

[57] ABSTRACT

A slide projector control module and control system to operate one or more slide projectors located at one or more different locations, each slide projector having a slide tray and being connected with the control module. Conventional telephone lines are used to connect each slide projector and each module at each location for viewing the same slide at all locations. Slide projectors at all locations are capable of being rendered operative and the slide projector is operative only at its location with its associated control module when properly selected. Each module includes switches to connect and disconnect the remote and local projector from a key pad which provides touch tone signals capable of being muted from telephone lines. The control system is operable from a local or remote site to permit conferences to discuss a series of visuals and to recall the visuals as needed at each site of a multi-site and/or multi-person conference. The slide projector control module is provided at each site and is capable of operation as a master or a slave to permit each site to be a master or slave operable from a local or a remote site, so that the slide viewed at each site presents the same visual.

20 Claims, 2 Drawing Sheets

REMOTE CONTROL SLIDE PROJECTOR MODULE

This invention is concerned with the remote control of one or more slide projectors via a touch-tone telephone system using conventional telephone lines.

More specifically, the invention is concerned with a system for controlling a slide projector by telephone transmission of touch tone signals (DTMF=dual tone multifrequency) to select any particular slide or a sequence of slides. Several remote locations can be tied together to permit control between all or any two locations.

The present invention is primarily concerned with the remote control of slide or microfiche devices in order to permit conferees who wish to discuss a series of predetermined visuals to recall them as needed at each site of a multi-site and multi-person conference. Each site is provided with a slide projector, a control device and the predetermined visuals, and each site can become a master with the other sites each as a slave. The remote control of a slide projector at one site permits the user at the one site to guide teleconferencing participants at the local site and remote sites in order to make a presentation. Individuals at other sites may randomly-access the system to another slide and take part in the presentation.

With the present invention, use is made of a conventional slide projector which can be randomly-accessed by the conference leader. Furthermore, the conference leader can control the slide presentation at one or more sites of a teleconference. Use is made of a conventional telephone handset and conventional telephone lines in conjunction with a touch-tone number pad which is incorporated into this invention. A readout is provided for a visual indication of the slide being viewed, and other controls are provided including power on/off, local projector control, and projector control during a teleconference. The number (pound) sign on the touch-tone pad is used to move one slide at a time forward and the asterisk on the pad is used to move one slide at a time backwards.

The presentation mode is directed towards visual materials that have been prepared and distributed in advance. For example, it is possible to prepare one or more slide trays which are compatible with the slide projectors at one or more selected teleconferencing locations and to schedule such conferences after the slide trays are delivered. The individuals at each site can control the position and the selection of the slide and tele-discussions can take place amongst the different locations. It is also within the concept of the present invention to control the slide presentation and slide movement solely from a single location.

SUMMARY OF THE INVENTION

The invention relates specifically to a remote slide projector controller (RSPC) interface which can be used to operate a slide projector locally at one or more remote locations, by means of telephone lines.

The RSPC operates in conjunction with a conventional projector, such as a KODAK (a registered trademark) RA 960 random access slide projector and a single line modular TOUCH-TONE (trademark) phone. With the RSPC, it is possible to control the slide presentation from any location equipped with a twelve button TOUCH-TONE (trademark) telephone. It is possible to control one slide projector or a plurality of slide projectors at any number of remote locations, and all of the slide projectors at the remote locations can participate in an audio-visual teleconference at the same time. All that is needed is the RSPC connected to the Kodak RA 960 projector and the operative telephone lines. Selecting the slide to be shown at any location is accomplished by using the buttons on the RSPC pad in any location, and this will cause the same slide to be shown at all locations at the same time, unless the system is shut down.

Two buttons must be used in accordance with a preferred embodiment of the present invention sequentially for the system to operate, and there are 100 possible functions. The conventional slide tray for this RA 960 projector contains 80 slides. Therefore the numbers from 01 to 80 are reserved for slide selection. With a special design, it is possible to use single numbers for slides in positions 1 to 9 to correspond to selection of solely single numbers for slide positions 1 to 9. The slides may be selected sequentially as well as randomly. 00 is used for the blank slot to return to the starting position for tray removal and the asterisk (or position thereof) is used to count down from a previous slide and the number sign or pound (or position thereof) is used to count up from a previous slide. If you do not go back to 00, you cannot remove the slide tray. Therefore, the RSPC automatically initializes and deengergizes the projector at 00, and thereby prevents damage to slide tray, slides and projector.

In order to operate with any type of projector other than the KODAK RA 960, special drive circuits to interface with the other manufactures projectors, also known as personality modules, may be required. Also, it is possible to use a microprocessor group in place of substantial portion of discrete logic.

A feature of the invention is the ability of the telephone signals to be applied to a dummy load as soon as a transmitted signal is received and recognized. The dummy load mutes the sound because the dummy load gives the appearance to the line of a telephone.

DESCRIPTION OF THE PREFERRED EMBODIMENTS

Figure 1:
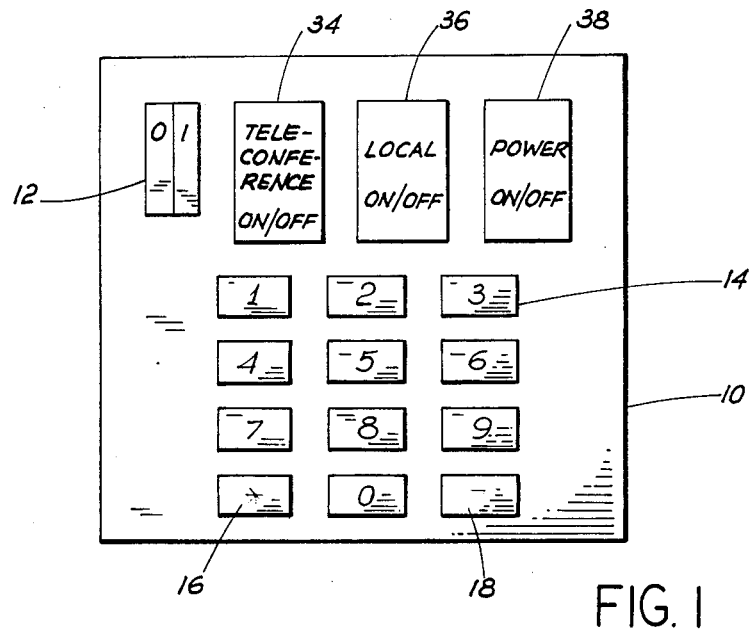
FIG. 1 is a view of the top front panel of the RSPC.
Figure 2:
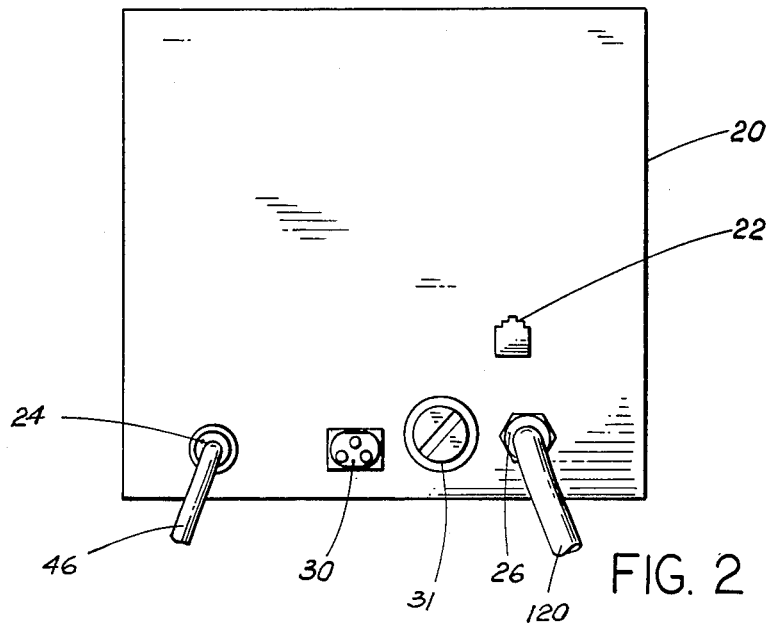
FIG. 2 is a rear view of the RSPC of FIG. 1.

Referring now more particularly to the drawings, which illustrate the best mode presently contemplated for carrying out the invention, the RSCP 10 as shown in FIG. 1 comprises a dual digit LED readout 12 to provide a visual indication of a slide being projected, and a conventional touch button touch pad 14 having twelve touch buttons of which button 16 has an asterisk and button 18 a number sign, 18 may also be considered to be a pound sign. The rear panel 20 (see FIG. 2) includes a conventional telephone socket 22 so as to permit the use of a modular plug from a local telephone 32 (see FIG. 3) for connection to line 65, a cable connection 24 for connection to a local telephone line or central station line 46, a projector cable socket 26 for connection to interface cable 120 for connection to a slide projector 28 (see FIG. 3), and a receptacle 30 for a power cord from a low voltage power transformer (not shown). The device is conventionally fused, and a fuse holder 31 is shown on the rear panel 20. Fuse holder 31 is removable for inspection. The location of the various elements on the rear panel can be varied as desired.

A conventional telephone hand set 32 (see FIG. 3) is connected to RSPC 10 through socket 22 for connection to conventional telephone lines through telephone line connection 24 and central station line 46.

The front panel of RSPC 10 is provided with switches 34, 36 and 38 each of which may be provided with a light emitting diode to show whether on or off. Switch 34 is the on/off control of projector 28 in the teleconference mode. Switch 36 controls the on/off of the local projector 28 or the local mode when not participating in a teleconference. Switch 38 is the power on/off switch of the RSPC. Either switch 34 or 36 is on; and both 34 and 36 cannot be activated simultaneously.

To operate in the local mode the projector or local switch 36 is turned on automatically, the projector is turned on and the projector slide tray moves to 00 and readout 12 indicates 00. When switch 36 is turned off, then the slide tray moves to 00, and the projector turns off, and readout 12 indicates 00.

If during local operation, the handpiece of a conventional telephone hand set 32 is lifted, the slide tray moves to the 00, the projector will turn off, and switch 36 will automatically turn off. The system is then automatically placed into the teleconference mode.

In the teleconference mode, switch 34, when turned on will turn on all projectors in all locations and all slide trays will move to the 00 position.

Figure 3:
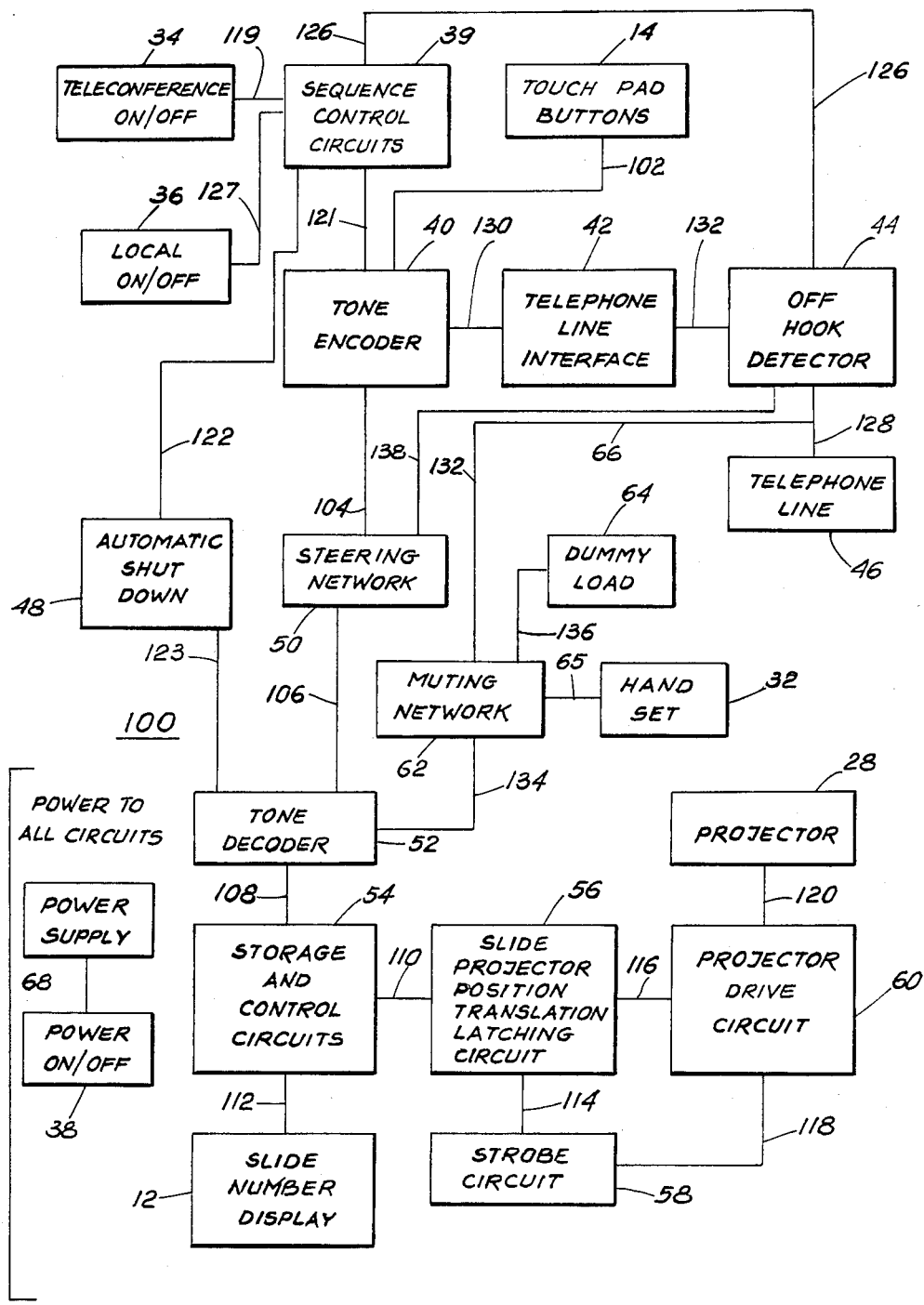
FIG. 3 is a block diagram of the RSPC circuit, the circuitry in each RSPC is the same, and each RSPC is operable as a master or a slave as well as for local operation.

Referring now to FIG. 3, which shows the circuitry 100 contained within RSPC 10, and the circuitry for ease of explanation is shown in block diagram which includes the system and controls to activate slide proector 28 locally and to go into the teleconference mode and to activate one or more similar slide projectors at remote locations. Each RSPC 10 at each location is identical and can be used both as a receiver and a sender, and may be designated, for example, as a transceiver. Power on/off switch 38 is connected with a conventional internal power supply 68 which supplies power to all of the circuits of circuitry 100.

A conventional tone encoder 40 is connected with and is responsive to tones from the touch tone buttons 14 of RSPC 10. Projector on/off teleconference mode switch 34 and local mode on/off switch 36 are connected to sequence control circuits 39. Sequence control circuits 39 when activated by switches 34 and 36 produces codes to activate tone encoder 40 for putting the projector on or off and returning the slide tray to 00. Tone encoder 40 is connected with telephone line interface 42 which is connected to a conventional off-hook detector 44 to telephone line or central station line 46. While the telephone line 46 is shown as a box, it is conventionally the modular plug which fits into the modular receptacle to the telephone line or line to the central station. Automatic shut down circuit 48 is a conventional circuit which is connected through conventional sequence control circuits 39 to tone encoder 40 so that if no signals are applied from touch pad 14 to tone encoder 40, through a conventional steering network 50 to a conventional tone decoder 52, and tone decoder 52 does not detect any tones for a predetermined period of time, automatic shut down 48 automatically returns the slide tray to the 00 position and shuts off the projector 28.

Steering network 50 has two inputs, one of which is connected with tone encoder 40 for local operation and the other of which is connected with the off-hook detector 44 and therethrough to telephone line 46 for operation of projector 28 from a remote location. Steering network 50 is adapted to receive encoded information either from its local tone encoder 40 or from a remote tone encoder 40 through the telephone line 46 and off-hook detector 44 and apply the information to tone decoder 52 to provide digital information for application to conventional storage and control circuits 54 for slide projector 28 operation.

Storage and display circuits 54 are connected to visual display or read-out slide designation 12 to provide a visual indication of the selected slide, whether selected at the local location or at the remote location, and applies signals to a slide projector position latching circuit 56 which includes the controls for positioning, translating and latching the projector. Latching circuit 56 is connected with a strobe circuit and a conventional projector drive circuit 60, which drive circuit is directly connected to projector 28. Drive circuit 60 is also connected with strobe circuit 58, and drive circuit 60 is only operable to drive projector 28 when strobe circuit 58 assures drive circuit 60 that the signal from latching circuit 56 is valid.

Tone decoder 52 also provides an output through line 134 to a conventional muting network 62 which is connected through line 136 with a dummy load 64. As soon as the system recognizes a valid signal through the tone decoder 52, hand set 32 is connected by means of lines 65 and 136 with dummy load 64 through muting network 62. Hand set 32 is also connected through line 65 to telephone socket 22; hand set 32 is connected through line 65 through muting network 62 through lines 66 and 128 to telephone line 46, all internally of the RSPC to telephone line 46 as well as being connected with dummy load 64 through line 65 muting network 62 and line 136. The tone decoder 52 enables the system to recognize a valid signal; and connects hand set 32 to the dummy load 64 through muting network 62. Therefore, the signal at hand set 32 is muted.

Low voltage power supply 68 is provided to supply the necessary low voltage to all circuits of circuitry 100 and its operation is controlled by power on/off switch 38.

DESCRIPTION OF OPERATION

The RSPC 10 uses a low voltage transformer which is to be plugged into a 110 volt AC electrical outlet and for this purpose, receptacle 30 is provided. The KODAK model RA 960 slide projector is also to be plugged into an 110 volt electrical outlet and the projector switch is to be moved to "random-access". Cable 120 from projector cable socket 26 of the RSPC 10 is to be plugged into the RA 960 projector generally designated 28. Switch 38 turns RSPC 10 on or renders it operative. Switch 36 offers local control of the projector by turning on the projector and permitting sequential or random access to slides through touch pad 14. If the hand set is removed, the slide tray automatically moves to 00 position and the projector and switch 36 will be turned off.

In this off-hook condition the system is automatically in the teleconference mode and any switch 34 can then turn on all projectors in the teleconference. With the projectors turned on, all slide trays will index to 00 and can then be accessed sequentially or randomly by any touch pad 14.

In local mode, when the hand set is on hook, local on/off switch 36 is moved to its on position to permit on-site operation of the projector.

The fuse holder 31 is removable for user-inspection. The projector interface cable 120 for connection of the module to the projector terminates in a polarized plug that mates to the rear panel of an RA-960 series KODAK projector or any plug which mates with equivalent projectors. The telephone cord and socket are commercial-standard 6-pin wiring.

After the necessary items are connected the control unit 10 is connected to an A.C. line, the LED display lights up, showing unit operation.

Access codes from 00 to 80 are entered by pressing the requisite key sequence on the touch pad 14. It is necessary to put in two digits or codes to activate the system. If one digit is entered and no second one, the control unit will wait three seconds, then erase the previously entered code. Codes 81–99 are reserved for special functions. An A-tone is used for on and a B-tone is used for off for the projector. When the projector is in off-condition, codes may be entered, but the projector will not react to them. The #, 18 and *, 16 keys on touch pad 14 activate the single-step function. Here, a single key-depression yields an up-count or a down-count. The # effects an up count, and the * effects a down count. Therefore, the following sequence of buttons pushed on the pad: 5-3-#-#-* would display: 53-54-55-54. Other control units sharing the same line, whether locally or remotely, will display the same sequence as the RSPC being used as control.

RSPC 10 can be used to control a local slide projector 28 or a similar slide projector located at a remote location. When switch 36 is placed into its on-mode, pad 14 can be used to select any slide at the local projector (same location).

Note, that it is not possible for teleconference projector switches 34 and local projector switches 36 to be activated at the same time. Either local mode or teleconference mode operation is possible at each RSPC 10, not both simultaneously.

In order to go into a teleconference mode, all that is necessary is to lift the handset of telephone hand set 32, so that the handpiece is off-hook, and dial a remote location or conference bridge if more than one remote location is involved. When the other parties are on the line, switch 34 is activated to turn on all projectors which are then automatically repositioned to the 00 position, and this is indicated in the read-out slide designation 12.

If RSPC 10 is not activated to select a slide within a predetermined time delay, the RSPC 10 causes all projectors both local and those in the teleconference mode automatically to return to 00 and shut off to prevent overheating of the projector.

The operation will be explained firstly with respect to local operation of projector 28 using the RSPC 10, and secondly using the same RSPC 10 and the telephone lines to operate a projector 28 located at one or more remote locations. Each location is provided with the same RSPC 10, the same type of projector 28 and each RSPC 10 contains the same circuitry 100 as described and shown in FIG. 3.

On/off power switch 38 is activated or placed into its "on" condition, and then subsequently or simultaneously with switch 38, local on/off switch 36 is activated, and two buttons 14 are pressed to select the desired slide to be projected by projector 28. It is necessary that two buttons be pressed; for slides 1 to 9, buttons 01 to 09 must therefore be activated. After touch pad 14 is activated, a signal is transmitted over line 102 to tone encoder 40 and then conventionally encoded thereby from encoder 40 this encoded signal is transmitted over line 104 to steering network 50. The signal is then transmitted over line 106 from steering network 50 to tone decoder 52. Since the system is in local operation, the muting network 62 and telephone line interface 42 are not in circuit and take no part in the operation. Tone decoder 52 then transmits a signal of digital information over line 108 to storage and control circuits 54. After the slide is selected and circuits 54 start to transmit to latching circuit 56 over line 110, a signal is also transmitted to slide number display 12 over line 112 to provide a visual indication of the number of the slide being projected by projector 28. Latching circuit 56 transmits a signal over line 114 to strobe circuit 58 and over line 116 to projector drive circuit 60, and to assure the projector drive circuit 60 that the signal is valid, it is also necessary for strobe circuit 58 to transmit an assurance signal over line 118 to drive circuit 60. Projector drive circuit 60 is a circuit which will only be rendered operative in response to the coincidence of a signal from both latching circuit 56 and strobe circuit 58.

In order to prevent burnout of the projector, an automatic shut down is provided by a signal transmitted over line 122 to sequence control circuits 39. Automatic shut down 48 is activated if no signal is transmitted thereto from the decoder 52 over line 123 within a predetermined time period which can be preselected internally, depending on the presetting used.

If for any reason, while the system is operating in the local mode, and the handpiece of telephone hand set 32 is removed from the set or is in the off-hook condition, off-hook detector 44 is activated and a signal is transmitted over line 126 to sequence control circuits 39, and over line 127 to switch 36 so that switch 36 is then automatically moved into the off-mode. Sequence control circuits 39 are connected through line 127 to local on/off switch 36 and through line 119 to teleconference on/off switch 34. Tone encoder 40 is connected to sequence control circuits 39 through line 121.

Also, as will be explained in connection with the description of remote operation, tone encoder 40 generates a signal to return the slide tray of the projector to the 00 position. In effect, picking up the handpiece of the hand set automatically takes the system out of local mode operation.

When the handpiece of hand set 32 is picked up at a master location, and a number dialed for a remote location for purpose of remote operation, and the remote location picks up, then a signal is received by telephone line 46 at the remote location and transmitted to off-hook detector 44 over line 128. Off-hook hook detector 44 immediately places the remote RSPC 10 into the teleconference mode and places teleconference on/off switch into the "on" condition.

At the master location, touch pad 14 is activated to select a slide. This information is now transmitted over line 102 to encoder 40 and from encoder 40 over line 130 to telephone line interface 42 and over line 132 to off-hook detector 44 and from off-hook detector 44 over line 128 to telephone company conventional telephone lines 46. At the same time, encoder 40 at the master location transmits the selected slide encoded information over line 104 through steering network 50 to projector 28 at the master location.

The telephone line interface 42 is a conventional approved FCC device to assure the telephone line that the signals are legitimate and FCC approved.

To facilitate explanation, the circuits at the local location will be suffixed with the letter L and the circuits at the remote location will be prefixed with the letter R.

A tone encoded signal from tone encoder 40L is now received by telephone line R46 and transmitted from off-hook detector R44 to steering network R50. From this point on, once steering network R50 receives a signal, RSPC R10 including tone decoder R52, storage and control circuits R54, slide number display R12, translation and latching circuit R56, strobe-circuit R58, projector drive circuit R60 all operate as the system operates when local operation only takes place to activate projector R28.

Switches 34, 36 and 38 include lights such as LED's showing operational modes.

When RSPC R10 and RSPC 10L are in a teleconference mode, outgoing telephone line interface 42L transmits an encoded signal from tone encoder 40L, and this signal goes through telephone line 46L to telephone line R46 to off-hook detector R44 to incoming telephone line interface R44 and therefrom through line 138 which in the receiving mode is line R138 to steering network R50 to tone decoder R52. As soon as tone decoder R52 in the teleconference mode recognizes a valid or legitimate transmitted signal, tone decoder R52 transmits a muting network activation signal through line R134 to muting network R62. Muting network R62 is connected through line R136 to dummy load R64. Dummy load R64 is activated and then mutes the tone sound at hand set R32 by directing the remaining signal to dummy load R64.

After tone decoder R52 recognizes a legitimate signal and at the same time that a signal is transmitted to the muting network R62, control signals are transmitted over line R108 to control circuits R54; these control signals contain digital information which operates the storage and control circuits in the same manner as the local operation operates all the projectors R28 and in the same manner as projectors 28L are operated at the local location so that all projectors are projecting the same slide at the same time, and this is indicated by visual displays by each slide number display R12 and 12L.

Should a participant at a remote location wish to interrupt a slide presentation and go to another RSPC 10, R10 is activated and tone encoder 40L then acts as a receiver and the remainder of RSPC 10L then operates as a remote controlled slide projector to control slide projector 28L from a remote location as well as other remote slide projectors R28.

Circuits 54 and 56 can be replaced with a microprocessor system 54/56 having an input through line 108 and outputs through lines 112, 114 and 116, and line 110 is not necessary because it is an internal connection.

While there has been shown and described what is considered to be the best mode presently contemplated by us for carrying out the invention, it will be obvious to those skilled in the art that various changes and modifications may be made therein without departing from the scope of the invention.

We claim:

1. A slide projector control module to operate one or more slide projectors located at one or more different locations, each said slide projector having a slide tray, and each said control module comprising;
   means connecting each slide projector with a control module;
   remote means using conventional telephone lines to connect each said slide projector and each said control module at each location so that the same slide is viewed at all locations;
   local means electrically associated with said remote means to render said remote means inoperative to operate the slide projector only at its location with its associated control module;
   switch means to operate said remote means to connect and disconnect said remote means from a key pad from the remote projectors; and
   muting means connected with said telephone lines to mute touch tone signals.

2. The module of claim 1, wherein said muting means includes a dummy load to which the touch tone signals are applied after recognition by a tone decoder.

3. The module according to claim 1, each including:
   a tone encoder connected with touch tone buttons on said key pad and responsive to touch tones generated thereby;
   a telephone line interface connected with said tone encoder and an off-hook detector connected to the telephone lines;
   an automatic shut-down circuit connected with said tone encoder; and
   switches responsive to said tone encoder not transmitting for automatically shutting off the projector and returning its associated slide tray to its 00 position.

4. The module according to claim 3, wherein the module at a local site is the local module and modules at remote sites are remote modules, and including:
   a steering network coupled with and responsive to said tone encoder and said off-hook detector to operate a projector at a remote location from the local module through the remote module at said remote location; and
   said steering network being adapted to receive encoded information either from a local or remote encoder and apply it to a tone decoder either at the local or the remote location to provide digital information for application to storage and control circuits for slide projector operation at the local and/or the remote location.

5. The module according to claim 4, each including:
   a latching circuit and a strobe circuit connected thereto and to a projector drive circuit for driving the projector;
   said latching circuit being responsive to storage and control circuits for positioning slides in the slide projector, translating the slides and latching the slides and the projector; and
   a strobe circuit also being connected to said projector drive circuit, and said projector drive circuit being operable only when said strobe circuit assures said drive circuit that a signal from said latching circuit is valid.

6. The module of claim 5, each including:
   a muting network and a dummy load connected thereto;
   said tone decoder being effective to enable the system to recognize a recognized code and to connect a telephone hand set to said dummy load through said muting network upon recognition of said recognized code.

7. The module according to claim 1, including:

a slide projector position translation latching circuit and a strobe circuit connected thereto and to a projector drive circuit for driving a projector coupled to said projector drive circuit;

said latching circuit being responsive to storage and control circuits for positioning each said slide in the slide tray of each said projector, translating the slide and latching the slide and the projector;

a strobe circuit also being connected to said latching circuit and said projector drive circuit, said projector drive circuit being operable only when said strobe circuit assures said drive circuit that a signal from said latching circuit is valid; and a muting network and a dummy load connected to said storage and control circuits through a tone decoder;

said tone decoder being effective to enable the module to recognize a recognized code and to connect a telephone hand set to said dummy load through said muting network upon recognition of said recognized code.

8. A module according to claim 1, each including:

a tone encoder connected with touch tone buttons on said key pad and responsive to touch tones generated thereby;

a telephone line interface connected with said tone encoder and an off-hook detector to the telephone line;

a steering network coupled with and responsive to said tone encoder and an off-hook detector to operate responsive to tones generated by said touch tone one or more of said projectors at the remote locations; and said steering network being adapted to receive encoded information either from a local or remote encoder and apply it to a tone decoder to provide digital information for application to storage and control circuits for slide projector operation;

an automatic shut-down circuit connected with said tone encoder; and switches responsive to said tone encoder not transmitting for automatically shutting off each projector and returning its associated slide tray to its 00 position.

9. A slide projector control system operable from a local site or a remote site to permit conferees who wish to discuss a single visual or a series of predetermined visuals incorporated in a slide tray of a slide projector and to recall the visuals in any order or sequences as needed at each location or site of a multi-site and/or multi-person conference wherein said local site or said remote site may be a transmitting or receiving site, including:

a slide projector control module for each said site and capable of operation as a master or a slave to permit each said site to be a master or slave operable from said local site or said remote site;

each said module including means compatible with conventional telephone lines to transmit and receive telephone signals between a module at one site or a transmitting site to a module at the other or receiving sites to control said slide projector at each said receiving site from the module at said transmitting site to provide a visual indication at said transmitting site and each said receiving site based on slides pre-selected at said transmitting site; and means enabling each said module to be operated as a master or transmitter at each said site or a slave or receiver at each said site or location, and including means pre-selecting operation of one of said modules as the master at a selected transmitting site with the modules at the other or said receiving sites or locations then being rendered operative as slaves.

10. The system of claim 9, wherein at least one of said modules includes means to control the slide presentation and slide movement solely from a single location.

11. The system of claim 9, wherein each of said modules includes means to control the slide presentation and slide movement from each of said sites.

12. The system of claim 9, including preselecting the slides and order of the slides to be placed into the slide tray, and a touch tone pad forming part of said module at one location for controlling and selecting the slide to be shown at each location at the same time.

13. The system of claim 12, including means preventing and enabling removal of the slide tray operable from a single remote location, thereby preventing damage to the tray, slides and projector.

14. The system of claim 9, including a dummy load, means to apply received signals to said dummy load as soon as a transmitted signal from a remote or said master module is received by one of said slave modules and recognized thereby, a muting network, and means coupling said dummy load to said muting network, said dummy load muting the sound of the telephone signals as the dummy load gives the appearance of a telephone to the telephone line.

15. The system of claim 9, including means responsive to a key pad slide selector on said module to shut down all projectors both local and remote to prevent burnout of the projectors if a slide is not selected or changed during a fifteen minute duration.

16. The system of claim 9, including a latching circuit and a strobe circuit coupled thereto, both said latching circuit and said strobe circuit being coupled to said projector through a projector drive circuit, and both said latching circuit and said strobe circuit transmitting a signal to said projector drive circuit for assurance thereof that the signal from said latching circuit is valid.

17. The system of claim 9, wherein each said module includes:

a tone encoder connected with touch tone buttons on a key pad of a telephone and responsive to touch tones generated thereby;

a telephone line interface connected with said tone encoder and an off-hook detector to the telephone line;

an automatic shut-down circuit connected with said tone encoder and switches, responsive to said tone encoder not transmitting for automatically shutting off the projector and returning its associated slide tray to its 00 position;

a steering network coupled with and responsive to said tone encoder and said off-hook detector to operate a projector at a remote location;

said steering network being adapted to receive encoded information either from a local or remote encoder and apply it to a tone decoder to provide digital information for application to storage and control circuits for slide projector operation; and a latching circuit and a strobe circuit connected thereto and to a projector drive circuit for driving the projector;

said latching circuit being responsive to said storage and control circuits for positioning the slide in the slide projector, translating the slide and latching the slide and projector;

said strobe circuit also being connected to said projector drive circuit, and said projector drive circuit being operable only when said strobe circuit assures said drive circuit that a signal from said latching circuit is valid.

18. The system of claim 17, wherein each said module includes:

a muting network and a dummy load connected thereto;

said tone encoder being effective to enable the system to recognize a recognized code and to connect the hand set to said dummy load through said muting network upon recognition of said recognized code; and switch means responsive to the touch tone signals for controlling said latching circuit and said strobe circuit to control the slide to be projected at each location.

19. A method for controlling a slide projector control system at plurality of sites for controlling and operating one or more slide projectors from one or more locations, said method being performable from a local site or a remote site to permit conferees who wish to discuss a series of predetermined visuals incorporated in a slide tray of a slide projector and to recall the visuals as needed at each location or site of a multi-site and/or multi-person conference, including the steps of:

providing a slide projector control module for each site and capable of operation as a master or a slave to permit each site to be a master or slave operable from a local site or a remote site;

providing each said module with means compatible with conventional telephone lines to transmit and receive telephone signals between a module at a preselected control site to control the slide projector at the preselected site and each of the other sites to provide a visual indication at all of the sites based on slides pre-selected at the preselected control site;

operating means enabling each said module to be operated as a master or a slave at each location in accordance with the site preselected as a master site, and including pre-selecting the operation of one of said modules as the master with the modules at the other location then being rendered operative as slaves and responsive to the module at the master site;

providing at each said site a telephone handset and coupling each telephone handset with each said module and the slide projector at all sites and connecting them to said slide projector such that when one of the telephone handsets is lifted, the projector slide tray moves to its 00 position; and each said module including:

a local switch to turn the slide projector on and off at the local site and to move the slide tray to the 00 position, said local switch at the local site being responsive to the lifting of said telephone handset to turn said local switch off and to turn the projector off;

a teleconferencing switch to turn on the slide projector connected thereto and place it into a teleconferencing mode;

a tone enoder connected with and responsive to tones from touch tone buttons for encoding the tones and a tone decoder for decoding encoded tones;

sequence control circuits responsive to said local swtich and said teleconferencing switch for producing codes to activate said tone encoder to return the slide tray to the 00 position and to turn the projector on or off;

a telephone line interface and an off-hook detector connected thereto and to a telephone line or central station line;

automatic shut-down circuit and steering network connected to said tone decoder for automatically shutting down and returning the slide tray to the 00 position when said tone decoder fails to detect any encoded tones for a predetermined period of time;

said steering network including two inputs, one of said inputs being connected with said tone encoder for local operation and the other of said inputs being connected with said off-hook detector to the telephone line for operation of a projector at a remote location, said steering network being adapted to receive encoded digital information based on encoded tones from a local or a remote tone encoder;

storage and control circuits for slide projector operation responsive to digital information output from said tone encoder;

strobe circuit and drive circuit means responsive to information from a latching circuit to drive the projector when the strobe circuit assures the drive circuit that the signal from the latching circuit is valid, said storbe circuit and said latching circuit together operating as an "and" circuit; and means at the master location for dialing a number of a remote location, said off-hook detector at said last-mentioned remote location being responsive thereto to place the module at the remote location in the teleconferencing mode and place said teleconference switch into the "on" condition.

20. The method of claim 19, wherein each said module includes:

a power on-off switch connected with an internal power supply to provide power to all circuits;

visual display information to provide visual information of the slide being displayed;

muting network connected with said dummy load and said hand set, said tone decoder enabling the system to recognize a valid signal and connect the hand set to the dummy load through said muting network;

removal of the hand set for placement thereof in the off-hook condition places the system automatically into the teleconferencing mode and said local switch is turned off while the teleconferencing switch is turned on, said local switch and said teleconferencing switch not being turned on at the same time; and means at a remote location to permit interruption of a slide presentation such that the module at the remote location becomes the master and the others become the slave modules.

* * * * *